(12) United States Patent
Soja et al.

(10) Patent No.: US 7,040,690 B2
(45) Date of Patent: May 9, 2006

(54) MOTOR VEHICLE HAVING A FRONT END COMPRISING AN AIR-GUIDING DEVICE AND METHOD OF MAKING AND USING SAME

(75) Inventors: Heinz Soja, Weil der Stadt (DE); Mathias Froeschle, Ostfildern (DE)

(73) Assignees: Dr. Ing h.c.F. Porsche AG, Stuttgart (DE); Prospective Concepts AG, Glättbrugg (CH)

( * ) Notice: Subject to any disclaimer, the term of this patent is extended or adjusted under 35 U.S.C. 154(b) by 443 days.

(21) Appl. No.: 10/315,223

(22) Filed: Dec. 10, 2002

(65) Prior Publication Data

US 2003/0116996 A1 Jun. 26, 2003

(30) Foreign Application Priority Data

Dec. 11, 2001 (DE) .................................. 101 60 748

(51) Int. Cl.
*B62D 37/02* (2006.01)

(52) U.S. Cl. ................................................... 296/180.5
(58) Field of Classification Search ............. 296/180.1, 296/180.5
See application file for complete search history.

(56) References Cited

U.S. PATENT DOCUMENTS

| | | | | | |
|---|---|---|---|---|---|
| 4,119,339 | A | * | 10/1978 | Heimburger | 296/180.5 |
| 4,131,308 | A | * | 12/1978 | Holka et al. | 296/180.5 |
| 4,159,140 | A | * | 6/1979 | Chabot et al. | 296/180.5 |
| 4,398,764 | A | * | 8/1983 | Okuyama | 296/180.1 |
| 4,460,213 | A | * | 7/1984 | Janssen et al. | 296/180.5 |
| 4,489,806 | A | * | 12/1984 | Shimomura | 296/180.5 |
| 4,558,897 | A | * | 12/1985 | Okuyama et al. | 296/180.5 |
| 4,653,788 | A | * | 3/1987 | Di Giusto | 296/180.1 |
| 4,659,130 | A | * | 4/1987 | Dimora et al. | 296/180.1 |
| 4,772,060 | A | * | 9/1988 | Kretschmer | 296/180.1 |
| 4,778,212 | A | * | 10/1988 | Tomforde | 296/180.1 |
| 4,810,021 | A | * | 3/1989 | Burst | 296/180.1 |
| 4,904,016 | A | * | 2/1990 | Tatsumi et al. | 296/180.5 |
| 4,976,489 | A | * | 12/1990 | Lovelace | 296/180.1 |
| 5,301,996 | A | * | 4/1994 | Theis | 296/180.1 |
| 5,511,847 | A | * | 4/1996 | Weisbarth et al. | 296/180.1 |
| 5,513,893 | A | * | 5/1996 | Nakata et al. | 296/180.1 |
| 5,692,796 | A | * | 12/1997 | Yamamoto et al. | 296/180.1 |
| 6,033,010 | A | * | 3/2000 | Preiss | 296/180.1 |
| 6,070,933 | A | * | 6/2000 | Tsukidate et al. | 296/180.1 |
| 6,199,796 | B1 | | 3/2001 | Reinhard et al. | |
| 6,209,947 | B1 | * | 4/2001 | Rundels et al. | 296/180.1 |

FOREIGN PATENT DOCUMENTS

| | | |
|---|---|---|
| DE | 3613301 | 10/1987 |
| DE | 3630645 A1 | 3/1988 |
| DE | 31 45 257 | 10/1989 |
| DE | 4209164 | 9/1993 |
| FR | 1338277 | 8/1963 |
| GB | 2017023 | 10/1979 |

OTHER PUBLICATIONS

European Search Report from EP 02 02 5028 dated Nov. 7, 2003.
German Office Action from German application 101 60 748.2 dated Nov. 18, 2002, and partial English translation.

* cited by examiner

*Primary Examiner*—Lori L. Coletta
(74) *Attorney, Agent, or Firm*—Crowell & Moring LLP

(57) ABSTRACT

An air guiding device is fastened to the front end of the motor vehicle and has a pneumatic operating element in order to displace the air guiding device from an inoperative position into an operative position. In order to protect the pneumatic operating element, for example, from stone as the motor vehicle is driven, the air guiding device comprises a spoiler lip comprising a flexible and elastic material, the pneumatic operating element is constructed as an inflatable hose which, viewed in the driving direction, is arranged behind the spoiler lip, and the elastic spoiler lip, in its inoperative position, rests under prestress against the front end.

38 Claims, 2 Drawing Sheets

MOTOR VEHICLE HAVING A FRONT END COMPRISING AN AIR-GUIDING DEVICE AND METHOD OF MAKING AND USING SAME

BACKGROUND AND SUMMARY OF THE INVENTION

This application claims the priority of German Patent Document 101 60 748.2, filed on Dec. 11, 2002, the disclosure of which is expressly incorporated by reference herein.

The invention relates to a motor vehicle having a front end comprising an air guiding device which has a pneumatic operating element in order to operatively displace the air guiding device from an inoperative position into an operative position.

A motor vehicle of the above-mentioned type is known from German Patent Document DE 31 45 257 C2. It has a front end on which an air guiding device is fastened which has a pneumatic operating element in order to displace the air guiding device from an inoperative position into a moved-out operative position. The pneumatic element simultaneously forms the spoiler element and is therefore implemented as an inflatable hollow body which, in the inflated condition, guides the air on the vehicle such that, at higher speeds, the wheel adhesion is to be increased and simultaneously the drag coefficient of the vehicle is to be reduced. When the inflated hollow body is to be moved into the inoperative position, it is evacuated by air suction. This known vehicle has the disadvantage that the hollow body may be damaged during the drive.

An aspect of the invention is to provide a motor vehicle of the initially mentioned type whose air guiding device has a longer service life.

This aspect can be achieved in that the air guiding device has a spoiler lip comprising a flexible and elastic material, wherein the pneumatic operating element is constructed as an inflatable hose arranged, viewed in a driving direction, behind the spoiler lip and wherein the elastic spoiler lip rests in the inoperative position under prestress against the front end. Additional characteristics further developing the invention are described below and in further embodiments.

Principal advantages achieved by certain preferred embodiments of the invention are that, as a result of the spoiler lip being arranged in front of the pneumatic operating element and displaced into the operative position, the pneumatic operating element is Protected from stones and from damage when driving over an object as the motor vehicle is driven. Also in the moved-in position or inoperative position of the air guiding device, the pneumatic operating element is covered by the elastic spoiler lip so that here also a protection is provided, for example, against accumulating dirt. As a result of that, in the inoperative position, the flexible and elastic spoiler lip is prestressed and in the process is placed against the front end or is placed almost against the front end, it is further prestressed or stretched when it is moved out, whereby a restoring force is built up and, when the hose is relieved from pressure, a automatic restoring of the spoiler lip occurs into the inoperative position. In addition, it is advantageous that, as a result of the prestressing, the spoiler lip is securely held in the inoperative position and therefore does not flutter during the drive.

As a further development, the hose has at least two chambers which are arranged above one another and which, viewed against the driving direction, are arranged offset with respect to one another. Thus, it is advantageous that, in the operative position, an aerodynamically advantageous contour is impressed on the spoiler lip.

In addition or as an alternative, according to a further development, the hose, viewed in cross-section, has a drop-shaped, oval, or circular construction, and thus the aerodynamic contour of the spoiler lip can be further influenced. If several chambers are provided, these may be constructed in a drop shape wherein at least one of the chambers, viewed in cross-section, has a drop-shaped, oval, or circular construction. The hose and the chambers, respectively, as an alternative, may have an oval or approximately circular cross-section.

In an embodiment the chambers, viewed in cross-section, have different sizes. The different size of the chambers may have an influence on the aerodynamic contour of the spoiler lip in the operative position.

A particularly favorable aerodynamic contour of the spoiler lip can be achieved in that the chamber situated adjacent to the spoiler lip has the smallest cross-section. Another alternative for the shaping of the spoiler lip in the operative position is that the chamber situated adjacent to the front end has the largest cross-section.

In an embodiment in which the chambers have a mutual air connection, it is advantageous that all chambers can be supplied by an air source. An alternative, in which each of the chambers is separately supplied with air, is advantageous in that, when one chamber is not tight, the other operable chambers can be activated, so that an emergency operation of the air guiding device can take place by way of the intact chambers.

In order to provide the air guiding device with a higher stability in the operative position, the chambers are fastened to one another or have a material lengthening by means of which they are held on the underside of the front end.

A particularly preferred embodiment in which, viewed in a transverse direction of the vehicle, the spoiler lip has mutually spaced ventilation openings for supplying air to the wheel brakes, and thus an overheating of the forward wheel brakes is avoided by providing ventilation openings in the spoiler lip.

The reinforcing of the ventilation openings in their edge area provides the spoiler lip with a high stiffness in the operative position.

A restoring of the spoiler lip displaced in the operative position is promoted by a further development wherein at a free end, the spoiler lip has a pocket in which a bending-elastic element is arranged which extends approximately along the entire width of the front end and which can be displaced in the pocket in a transverse direction of the vehicle. The bending-elastic element arranged in the pocket also stiffens the spoiler lip in the operative position and supports the spoiler lip in the area below the ventilation openings, in which area the hose or the chambers can be recessed.

According to a further development wherein the front end has a recess which extends along the width of the front end and, in which, the hose and the spoiler lip are situated in the inoperative position, the spoiler lip is lowered into a recess of the front end so that it does not impair the clearance of the vehicle above the road surface in the area of the front end.

The spoiler lip made of the elastic material was found to be particularly advantageous in the case of a front end which, viewed in the driving direction, is curved out. The elastic spoiler lip can easily adapt itself to the curved shape.

An embodiment wherein the air guiding device can be displaced as a function of a driving speed of the motor vehicle into the operative position and back into the inoperative position, and vice-versa, is preferable in which case, as a function of the driving speed of the motor vehicle, the spoiler lip is displaced into the operative position or is displaced back from the operative position into the inoperative position. Particularly, at low speeds, the spoiler lip will be in the inoperative position so that, for example, during the parking of the motor vehicle, a damaging of the spoiler lip on the curb is avoided.

An embodiment is provided for constructing the spoiler lip and the hose or the chambers in one piece, and thus form a prefabricated module, whereby a simple manufacturing of the air guiding device is permitted. In addition, when the one-piece air guiding device is moved, no friction occurs between the spoiler lip and the pneumatic element.

In a further development wherein the hose and/or at least one of the chambers, viewed in a transverse direction of the vehicle, is constructed to be elastically flexible and to be substantially inflexible in cross-section. Therefore, it is advantageous that the hose, which is elastically flexible in the transverse direction of the vehicle, can adapt itself to the curved or bent shape of the front end so that the hose can uniformly support the spoiler lip and can provide additional restoring force in the operative position. With respect to the cross-section, the hose or the chamber cannot be stretched, whereby the aerodynamic contour impressed on the spoiler lip by the cross-sectional shape of the hose is not influenced.

According to a preferred embodiment wherein a protective element for the pneumatic element extends between a rearward side of the spoiler lip and an underside of the front end, the pneumatic element is protected from dirt and damage.

Other objects, advantages and novel features of the present invention will become apparent from the following detailed description of the invention when considered in conjunction with the accompanying drawings.

DETAILED DESCRIPTION OF THE DRAWINGS

Figure 1:
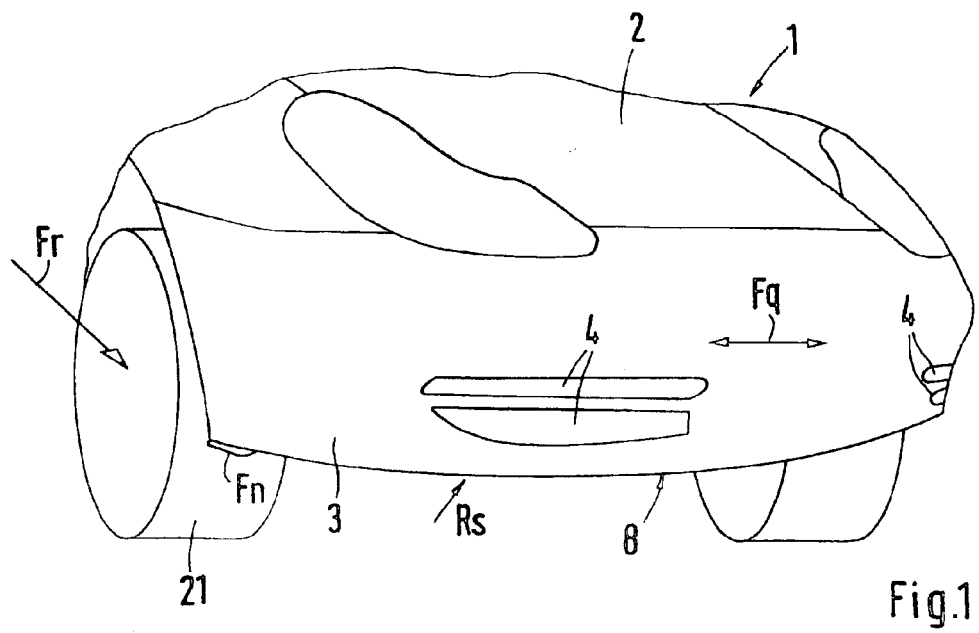
FIG. 1 shows a cutout-type view of a front end of a motor vehicle with an air guiding device situated in its inoperative position.

FIG. 1 is a cutout-type view of a motor vehicle 1, particularly a passenger car, with a front end 2 having a front-end covering part 3, behind which a bumper cross member can be arranged which is not visible here. Several radiator openings 4 may be provided in the front-end covering part 3, behind which heat exchanger or cooling devices for the driving engine of the vehicle 1 can be arranged. According to FIG. 2, the front end 2 is equipped with an air guiding device 5 which, in its moved-out operative position Ws, is shown in FIG. 2 and, in FIG. 1, is situated in its moved-in inoperative position Rs under the front end 2 and is therefore not visible there.

Figure 2:
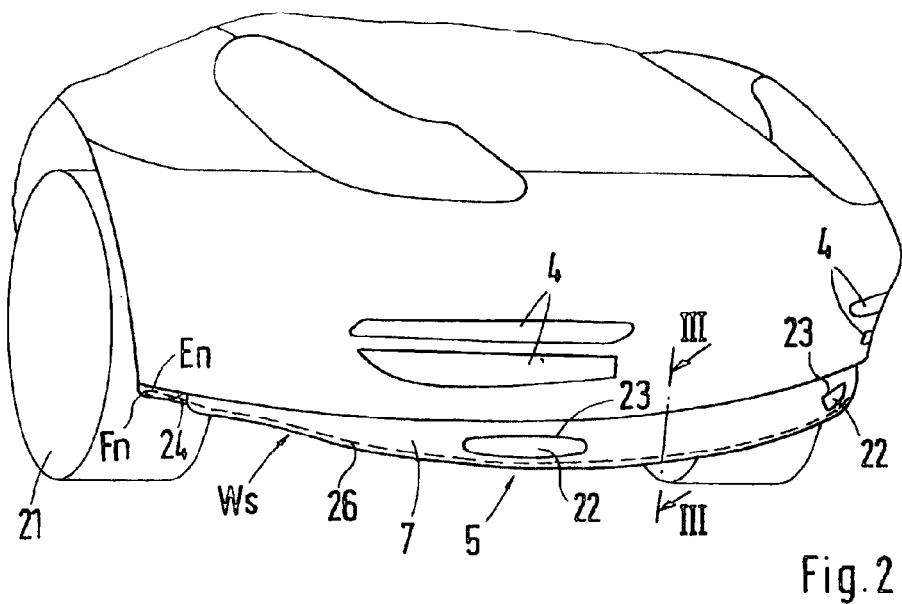
FIG. 2 shows a view of the front end according to FIG. 1 with an air guiding device moved out into the operative position corresponding to a first embodiment.
Figure 3:
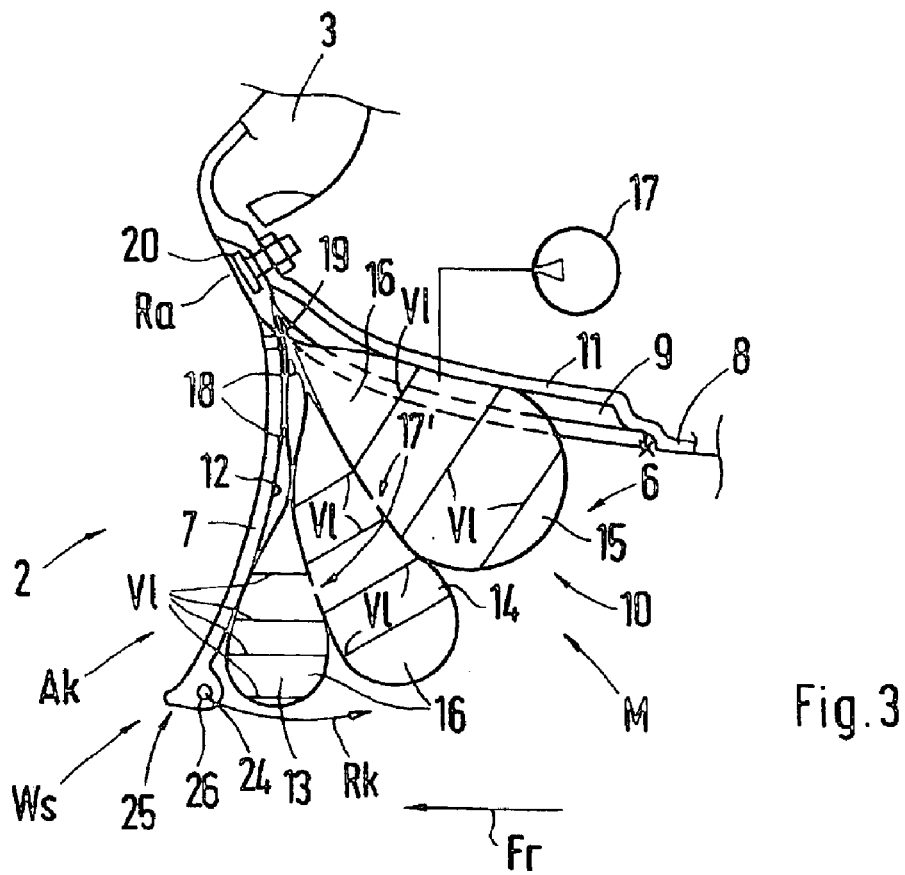
FIG. 3 shows a sectional view of the air guiding device corresponding to Line III—III in FIG. 2.

In the following, the air guiding device 5 will be described in detail as shown in FIGS. 2 and 3. The air guiding device 5 has a pneumatic operating element 6 by way of which a spoiler lip 7 of the air guiding device 5 constructed as a strip can be displaced or moved out into the approximately vertical operative position Ws. The spoiler lip 7 is made of a flexible and elastic material, such as rubber or the like, and, in its inoperative position Rs rests approximately horizontally under the front end 2, particularly against the underside 8 of the front-end covering part 3. By way of its edge Ra, the spoiler lip is fastened to the front end 2. In the inoperative position Rs, the pneumatic operating element 6 as well as the spoiler lip 7 can be lowered in a recess 9 provided on the underside 8 of the front-end covering part 3, in which case the recess 9 can extend along almost the entire width, in the transverse direction Fq, of the front-end covering part 3.

The pneumatic operating element 6 is constructed as an inflatable hose 10 which, viewed in the driving direction Fr, is arranged behind the spoiler lip 7 and extends along almost the entire width of the front-end covering part 3 or of the spoiler lip 7.

As a result that the spoiler lip 7 is made of a flexible and elastic material, it can be prestressed in its inoperative position Rs. This prestressing of the spoiler lip can be achieved by the shaping of the spoiler lip 7 in the uninstalled condition or during the manufacturing of the spoiler lip 7. In addition or as an alternative, the prestressing may also be applied by a corresponding prestressed mounting of the spoiler lip 7 on the front end 2. Irrespective of how the prestressing is achieved, its operative direction extends toward the underside 8, so that, in the inoperative position Rs, the spoiler lip 7 is placed against the front end covering part 3 or the front end 2.

The spoiler lip 7 is stretched during the displacement from the inoperative position Rs into the operative position Ws, so that a restoring force Rk is built up as a result, which, when the inflatable hose 10 is relieved from pressure, compresses the hose 10 between the base 11 of the recess 9 and the rearward side 12 of the spoiler lip 7, whereby the hose 10 is evacuated and is folded together in the inoperative position Rs.

FIG. 3 illustrates that the hose 10 has several chambers 13, 14 and 15 which are arranged above one another and offset with respect to one another against the driving direction Fr. In addition, the chambers 13 to 15, viewed in the cross-section, have a different size, in which case the chamber 13 which is adjacent to the spoiler lip 7 has a smaller cross-section or a smaller size than the two other chambers 14 and 15. In contrast, chamber 15 adjacent to the front end 2 or to the front-end covering part 3 has the largest cross-section. The cross-section of at least one of the chambers 13 to 15, but preferably of all chambers 13, 14, 15 is drop-shaped, the upper chamber ends 16 being situated side-by-side so that, viewed in the overall cross-section of the hose 10, an approximately sector-shaped, particularly quarter-sector-shaped cross-section is obtained.

By way of the selection of the cross-section of the chambers 13 to 15, the aerodynamic contour Ak of the spoiler lip 7 is influenced. In the illustrated embodiment, the contour Ak is selected to be curved against the driving direction Fr, and the spoiler lip 7 follows the curved-out shape of the front end 2. The drop shape of the chambers 13 to 15 can be achieved by way of strip-shaped shaping lugs VI which are arranged inside the chambers 13 to 15, are connected with the interior wall of the chambers 13 to 15 and bring the filled chambers into the desired shape. At least one shaping lug VI is provided for each chamber 13, 14 or 15.

In order to fill the hose 10 with air and thus displace the spoiler lip 7 into its operative position Ws, a pump 17 may be provided which is connected with the hose 10. So that each chamber 13 to 15 can be filled, air connections 17' are preferably provided between two adjacent chambers 13 and 14, 14 and 15. A separate connection to each chamber 13 to 15 could be constructed instead of the air connections, in which case, each connection can extend by way of a valve device to the pump 17 in order to, for example, not supply one of the chambers with air, should this chamber not be tight. In addition, the chambers 13 to 15 can be fastened to one another. As an alternative or in addition, a material lengthening 18 can be mounted on each chamber end 16 for the fastening of the chambers 13 to 15 on the front end covering part 3. The end 19 of the material lengthening 18 is held between the end 20 of the spoiler lip on the side of the front-end covering part and the front-end covering part 3 by way of clamping, so that the chambers are held above one another. The spoiler lip 7 can, for example, be fastened by way of a screwed or snap connection on the front-end covering part 3.

In order to be able to sufficiently supply the brakes, not shown here, of the front wheels 21 with cooling air when the air guiding device 5 is in the operative position Ws, one or several ventilation openings 22 are made in the spoiler lip 7. These ventilation openings 22 are situated, for example, at a distance from one another measured in the transverse direction Fq of the vehicle, so that at least one ventilation opening 22 is in each case assigned to a front wheel 21. In order not to influence the stiffness of the spoiler lip 7 by the ventilation openings, the edge area 23 of each opening 22 can be reinforced. A plastic frame or the like, for example, can be provided for this reinforcement. If the ventilation openings 22 are provided in the spoiler lip 7, preferably several hoses 10 are arranged in a spaced manner side-by-side in series, thus distributed along the width of the spoiler lip 7, so that the ventilation openings 22 are not closed.

During the moving-out of the spoiler lip 7 into the operative position Ws, the lip 7 is stretched, whereby the restoring force Rk is built up which can be intensified by a bending-elastic element 24 held on the spoiler lip 7. The element 24 may be inserted, for example, at the free end 25 of the spoiler lip into a pocket 26. The bending-elastic element 24 is, for example, a plastic rod which may be fiber-reinforced. The bending-elastic element 24 preferably extends along the entire width of the front end 2 or of the front-end covering part 3, as indicated in FIG. 2 by a broken line. Because the spoiler lip 7 is stretched during the displacement into the operative position Ws, the element 24 is arranged in a loose manner or displaceably in the transverse direction Fq of the vehicle in the pocket 26. The lateral ends En of the element 24 are displaceably guided in lateral guides Fn, whereby these ends, when the spoiler lip 7 is moved into the operative position Ws, are pulled in areas out of the guides Fn. If the rod-shaped element 24 is prestressed while it is bent and thus is inserted into its guides Fn, the prestressing of the spoiler lip 7 is promoted. It is also conceivable to provide the prestressing for the spoiler lip 7 exclusively by way of the prestressed element 24.

The pocket 26 and the spoiler lip 7 are preferably produced in one piece. In addition, it is possible to provide the air guiding device 5 as a prefabricated module M by spraying the spoiler lip 7 to the pneumatic operating element 6, which module M is fastened to the front-end covering part 3. It would also be conceivable to produce the hose 10 or the chambers 13 to 15 at least in sections of a textile fabric which is subsequently provided with the flexible and elastic material for the spoiler lip 7, for example, the material being sprayed around it, so that the spoiler lip is also formed.

In a preferred embodiment, the hose 10 or at least one of the chambers 13 to 15, particularly the chamber 13, viewed in the transverse direction Fq of the vehicle, has an elastically flexible construction so that, in the operative position Ws, they can follow the outwardly curved contour of the front-end covering part 3. However, in the radial direction, the hose 10 or the chambers 13 to 15 have an inflexible construction so that, irrespective of the air pressure existing in the hose 10 or in the chambers 13 to 15, they cannot be widened in their cross-section. As a result, a sufficient stiffness of the pneumatic operating element 6 is achieved in the operative position Ws.

Figure 4:
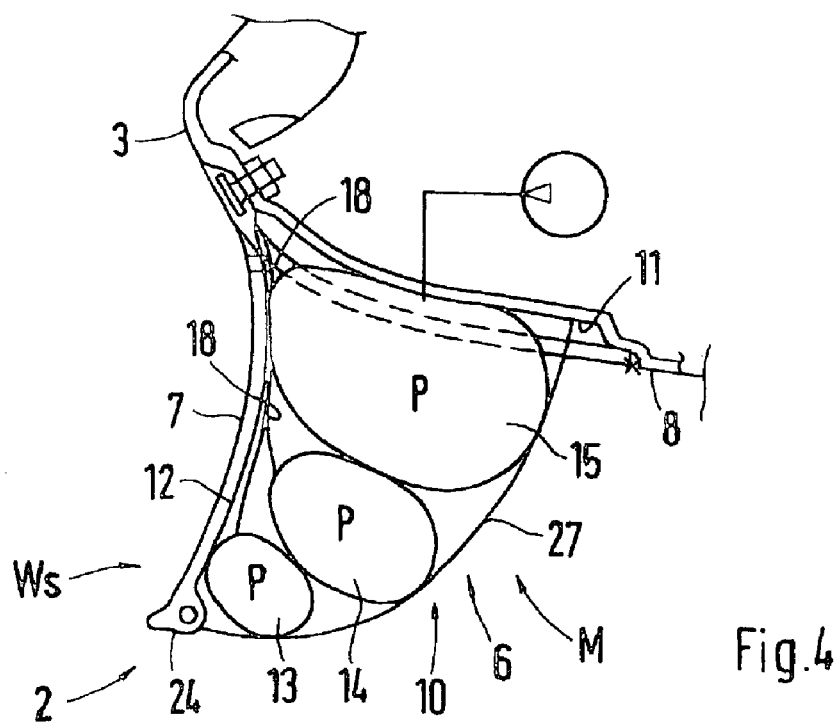
FIG. 4 shows a sectional view of an air guiding device according to a second embodiment.

The embodiment of an air guiding device 2 illustrated in FIG. 4 differs from the air guiding device 2 illustrated in FIG. 3 only by way of a modified pneumatic element 6. Here, the cross-section of the chambers 13 to 15 is selected to be oval or approximately circular, which cross-section will then be set by the air pressure p existing in the chambers 13 to 15 and as a function of the space existing between the rearward side 12 and the underside 8. In addition, a protective element 27 is assigned to the air guiding device 2, which protective element 27 may extend from the free end 24 to the underside 8 and along the width of the element 6 viewed in the transverse direction Fq of the vehicle. The protective element 27 may be manufactured in one piece with the spoiler lip 7 and/or the element 6 and may be formed, for example, by the textile fabric of the chambers 13 to 15 or may be fastened to them.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle having a front end comprising an air guiding device which has a pneumatic operating element in order to operatively displace the air guiding device from an inoperative position into an operative position,
    wherein the air guiding device has a spoiler lip comprising a flexible and elastic material,
    wherein the pneumatic operating element is constructed as an inflatable hose arranged, viewed in a driving direction, behind the spoiler lip, and
    wherein the elastic spoiler lip rests in the inoperative position under prestress against the front end.

2. Motor vehicle according to claim 1, wherein the hose has at least two chambers which are arranged above one another and which, viewed against the driving direction, are arranged offset with respect to one another.

3. Motor vehicle according to claim 1, wherein the hose, viewed in the cross-section, has a drop-shaped, oval, or circular construction.

4. Motor vehicle according to claim 2, wherein at least one of the chambers, viewed in the cross-section, has a drop-shaped, oval, or circular construction.

5. Motor vehicle according to claim 2, wherein, viewed in the cross-section, the chambers have different sizes.

6. Motor vehicle according to claim 4, wherein, viewed in the cross-section, the chambers have different sizes.

7. Motor vehicle according to claim 5, wherein the chamber situated adjacent to the spoiler lip has the smallest cross-section.

8. Motor vehicle according to claim 5, wherein the chamber situated adjacent to the front end has the largest cross-section.

9. Motor vehicle according to claim 2, wherein the chambers have a mutual air connection.

10. Motor vehicle according to claim 3, wherein the chambers have a mutual air connection.

11. Motor vehicle according to claim 5, wherein the chambers have a mutual air connection.

12. Motor vehicle according to claim 2, wherein each of the chambers is separately supplied with air.

13. Motor vehicle according to claim 3, wherein each of the chambers is separately supplied with air.

14. Motor vehicle according to claim 5, wherein each of the chambers is separately supplied with air.

15. Motor vehicle according to claim 2, wherein the chambers are fastened to one another or are held above one another under the front end by at least one material lengthening of the chambers.

16. Motor vehicle according to claim 3, wherein the chambers are fastened to one another or are held above one another under the front end by at least one material lengthening of the chambers.

17. Motor vehicle according to claim 5, wherein the chambers are fastened to one another or are held above one another under the front end by at least one material lengthening of the chambers.

18. Motor vehicle according to claim 1, wherein, viewed in a transverse direction of the vehicle, the spoiler lip has mutually spaced ventilation openings for supplying air to wheel brakes.

19. Motor vehicle according to claim 2, wherein, viewed in a transverse direction of the vehicle, the spoiler lip has mutually spaced ventilation openings for supplying air to wheel brakes.

20. Motor vehicle according to claim 3, wherein, viewed in a transverse direction of the vehicle, the spoiler lip has mutually spaced ventilation openings for supplying air to wheel brakes.

21. Motor vehicle according to claim 18, wherein the ventilation openings are reinforced in edge areas.

22. Motor vehicle according to claim 1, wherein, at a free end, the spoiler lip has a pocket in which a bending-elastic element is arranged which extends approximately along the entire width of the front end and which can be displaced in the pocket in a transverse direction of the vehicle.

23. Motor vehicle according to claim 2, wherein, at a free end, the spoiler lip has a pocket in which a bending-elastic element is arranged which extends approximately along the entire width of the front end and which can be displaced in the pocket in a transverse direction of the vehicle.

24. Motor vehicle according to claim 3, wherein, at a free end, the spoiler lip has a pocket in which a bending-elastic element is arranged which extends approximately along the entire width of the front end and which can be displaced in the pocket in a transverse direction of the vehicle.

25. Motor vehicle according to claim 5, wherein, at a free end, the spoiler lip has a pocket in which a bending-elastic element is arranged which extends approximately along the entire width of the front end and which can be displaced in the pocket in a transverse direction of the vehicle.

26. Motor vehicle according to claim 1, wherein the front end has a recess which extends along the width of the front end and, in which, the hose and the spoiler lip are situated in the inoperative position.

27. Motor vehicle according to claim 2, wherein the front end has a recess which extends along the width of the front end and, in which, the hose and the spoiler lip are situated in the inoperative position.

28. Motor vehicle according to claim 3, wherein the front end has a recess which extends along the width of the front end and, in which, the hose and the spoiler lip are situated in the inoperative position.

29. Motor vehicle according to claim 22, wherein the front end has a recess which extends along the width of the front end and, in which, the hose and the spoiler lip are situated in the inoperative position.

30. Motor vehicle according to claim 1, wherein, viewed in the driving direction, the front end is curved out.

31. Motor vehicle according to claim 1, wherein the air guiding device is arranged on an underside of the front end.

32. Motor vehicle according to claim 1, wherein the air guiding device can be displaced as a function of a driving speed of the motor vehicle into the operative position and back into the inoperative position and vice-versa.

33. Motor vehicle according to claim 1, wherein the spoiler lip and the hose or chambers are manufactured in one piece and form a prefabricated module.

34. Motor vehicle according to claim 2, wherein one of the hose and at least one of the chambers, viewed in a transverse direction of the vehicle, is constructed to be elastically flexible and to be substantially inflexible in cross-section.

35. Motor vehicle according to claim 1, wherein the hose, viewed in a transverse direction of the vehicle, is constructed to be elastically flexible and to be substantially inflexible in cross-section.

36. Motor vehicle according to claim 1, wherein a protective element for the pneumatic element extends between a rearward side of the spoiler lip and an underside of the front end.

37. Motor vehicle according to claim 2, wherein a protective element for the pneumatic element extends between a rearward side of the spoiler lip and an underside of the front end.

38. An air guiding device for a front end of a vehicle, comprising:
   a pneumatic operating element which operatively displaces the air guiding device from an inoperative position into an operative position, and
   a spoiler lip of a flexible and elastic material,
   wherein the pneumatic element is at least one inflatable hose arranged behind the spoiler lip, and
   wherein the spoiler lip is prestressed against the front end in the inoperative position.

* * * * *

UNITED STATES PATENT AND TRADEMARK OFFICE
CERTIFICATE OF CORRECTION

PATENT NO. : 7,040,690 B2
APPLICATION NO. : 10/315223
DATED : May 9, 2006
INVENTOR(S) : Heinz Soja et al.

It is certified that error appears in the above-identified patent and that said Letters Patent is hereby corrected as shown below:

On the title page, item (75), the third inventor should be:

Andrin Landolt, Maennedorf (CH)

Signed and Sealed this

Sixth Day of March, 2007

JON W. DUDAS
*Director of the United States Patent and Trademark Office*